United States Patent
Tsujii et al.

(10) Patent No.: US 9,950,385 B2
(45) Date of Patent: Apr. 24, 2018

(54) WIRE FEEDING MECHANISM AND ARC PROCESSING SYSTEM EMPLOYING THE SAME

(71) Applicant: DAIHEN Corporation, Osaka-shi, Osaka (JP)

(72) Inventors: Gen Tsujii, Osaka (JP); Ryoji Tamaki, Osaka (JP)

(73) Assignee: DAIHEN Corporation, Osaka (JP)

( * ) Notice: Subject to any disclaimer, the term of this patent is extended or adjusted under 35 U.S.C. 154(b) by 119 days.

(21) Appl. No.: 14/602,810

(22) Filed: Jan. 22, 2015

(65) Prior Publication Data

US 2015/0209890 A1 Jul. 30, 2015

(30) Foreign Application Priority Data

Jan. 27, 2014 (JP) ................... 2014-012354
Jan. 27, 2014 (JP) ................... 2014-012355

(51) Int. Cl.
*B23K 9/133* (2006.01)

(52) U.S. Cl.
CPC .......... *B23K 9/1333* (2013.01); *B23K 9/1336* (2013.01)

(58) Field of Classification Search
CPC ............................ B23K 9/1333; B23K 9/1336
USPC ....................................... 219/137.7
See application file for complete search history.

(56) References Cited

U.S. PATENT DOCUMENTS 3,421,712 A * 1/1969 Scroggie ................ B65H 54/50
242/127
3,829,036 A * 8/1974 Meadows ............... B65H 49/30
242/575.5
4,572,421 A 2/1986 Hug et al.
4,899,945 A 2/1990 Jones
5,248,548 A * 9/1993 Toon ................ A41D 19/01511
2/167
5,295,733 A * 3/1994 LeBegue ................ B65H 51/22
226/191

(Continued)

FOREIGN PATENT DOCUMENTS

DE 36 21 932 A1 1/1988
DE 3621932 A1 * 1/1988 ............. B65H 51/20

(Continued)

OTHER PUBLICATIONS

Extended European Search Report issued in corresponding European Patent application No. 15 15 2155.6 dated Jul. 28, 2015 (3 pages).

(Continued)

*Primary Examiner* — David Angwin
*Assistant Examiner* — Spencer H Kirkwood
(74) *Attorney, Agent, or Firm* — Hamre, Schumann, Mueller & Larson, P.C.

(57) ABSTRACT

A wire feeding mechanism includes feeding rollers and a cushioning mechanism. The feeding rollers feed a wire, which is drawn from a wire supply source, along a predetermined feed path. The cushioning mechanism is arranged between the wire supply source and the feeding rollers. The wire has an intermediate portion that extends from the wire supply source to the feeding rollers. The cushioning mechanism applies tension to the intermediate portion while the length of the intermediate portion is changing.

8 Claims, 14 Drawing Sheets

(56) References Cited

U.S. PATENT DOCUMENTS

| | | | |
|---|---|---|---|
| 5,811,750 A * | 9/1998 | Caprioglio | B23K 11/309 |
| | | | 219/81 |
| 8,704,132 B2 | 4/2014 | Artelsmair et al. | |
| 9,586,249 B2 * | 3/2017 | Wolf | B21C 47/16 |
| 2007/0164074 A1 | 7/2007 | Schorghuber et al. | |

FOREIGN PATENT DOCUMENTS

| | | |
|---|---|---|
| DE | 10 2010 047 531 A1 | 4/2012 |
| EP | 0 803 310 A1 | 10/1997 |
| JP | 49-77219 U1 | 7/1974 |
| JP | 58-151966 A | 9/1983 |
| JP | 41-25069 A | 12/1996 |
| JP | 2007-506558 A | 3/2007 |
| JP | 2009-248159 | 10/2009 |
| JP | 2009-263683 A | 11/2009 |
| JP | 2010-52021 A | 3/2010 |
| JP | 2010-194576 A | 9/2010 |
| JP | 2007-518568 | 7/2017 |
| WO | 01/38034 A1 | 5/2001 |

OTHER PUBLICATIONS

Office Action issued in corresponding Japanese Patent Application No. 2014-012354, dated Oct. 17, 2017 ( 7 pages).

Office Action issued in corresponding Japanese Patent Application No. 2014-012355, dated Oct. 17, 2017 (4 pages).

* cited by examiner

WIRE FEEDING MECHANISM AND ARC PROCESSING SYSTEM EMPLOYING THE SAME

BACKGROUND OF THE INVENTION

1. Field of the Invention

The present invention relates to a wire feeding mechanism and an arc processing system that employs the wire feeding mechanism.

2. Description of Related Art

There are conventionally-known apparatuses for performing arc processing such as thermal spraying and welding using a wire. For example, the apparatus disclosed in JP-A-2009-248159 includes a wire reel and a roller. A welding wire is wound around the wire reel. The roller moves in cooperation with a feed motor so as to draw the welding wire from the wire reel and feed it toward a workpiece targeted for processing.

With this type of apparatus, there are cases where there is slack in the welding wire between the roller and the wire reel when the feeding of the welding wire is started. In this case, even if the roller starts rotating, the wire reel does not rotate as long as there is slack in the wire. Then as soon as the slack is eliminated, the tension in the welding wire between the roller and the wire reel rapidly increases, and the wire reel begins to rotate. It is possible for slippage to occur between the roller and the welding wire at this time. This slippage hinders the appropriate supply of the welding wire, and has the risk of leading to a problem such as a decrease in the quality of the arc processing or an arc start failure.

In another example, JP-A-2007-518568 discloses a welding wire housing apparatus for use in an arc processing system. This welding wire housing apparatus functions as a buffer for stably supplying welding wire to a workpiece. However, this welding wire housing apparatus has a configuration in which the wire is simply held so as to have an arch, and there is still room for improvement in terms of a welding wire buffer.

SUMMARY OF THE INVENTION

The present invention has been proposed in light of the above-described circumstances. In view of this, an object of the present invention is to provide a wire feeding mechanism that can stably feed a wire. Another object of the present invention is to provide a wire feeding mechanism that can achieve a higher wire buffer amount.

A first aspect of the present invention provides a wire feeding mechanism. This wire feeding mechanism includes a first feeding roller for feeding wire along a feed path, the wire being drawn from a wire supply source, and a cushioning mechanism arranged in the feed path between the wire supply source and the first feeding roller. The wire has an intermediate portion that extends from the wire supply source to the first feeding roller, and the cushioning mechanism is configured to apply tension to the intermediate portion of the wire while a partial path length of the intermediate portion is changing, the partial path length being the length of the intermediate portion.

According to a second aspect of the present invention, in the wire feeding mechanism of the first aspect, the cushioning mechanism includes at least one catching portion that comes into contact with the wire, and the catching portion is capable of moving relative to the first feeding roller.

According to a third aspect of the present invention, in the wire feeding mechanism of the second aspect, the cushioning mechanism includes a force applying member that applies force to the at least one catching portion so as to increase the partial path length.

According to a fourth aspect of the present invention, in the wire feeding mechanism of the third aspect, the force applying member is configured to apply force to the at least one catching portion using any one of elastic force, gravity, and gas pressure.

According to a fifth aspect of the present invention, in the wire feeding mechanism of any of the second to fourth aspects, a portion of the intermediate portion of the wire forms a loop, and the at least one catching portion is configured to come into contact with the loop.

According to a sixth aspect of the present invention, in the wire feeding mechanism of the fifth aspect, the cushioning mechanism is configured to change the area of the loop in accordance with change in the partial path length.

According to a seventh aspect of the present invention, in the wire feeding mechanism of the fifth or sixth aspect, the cushioning mechanism includes a base that supports the at least one catching portion, and the at least one catching portion is capable of moving relative to the base.

According to an eighth aspect of the present invention, in the wire feeding mechanism of the seventh aspect, the cushioning mechanism includes an additional catching portion that comes into contact with the loop, and a plurality of support members that are supported so as to be capable of moving relative to the base, and the at least one catching portion and the additional catching portion are provided on the plurality of support members.

According to a ninth aspect of the present invention, in the wire feeding mechanism of the eighth aspect, the at least one catching portion and the additional catching portion are configured to move in synchronization with each other relative to a center of the loop.

According to a tenth aspect of the present invention, in the wire feeding mechanism of the ninth aspect, the cushioning mechanism includes a connecting member for synchronizing movement of the at least one catching portion and the additional catching portion.

According to an eleventh aspect of the present invention, in the wire feeding mechanism of the tenth aspect, the connecting member is one of a belt and a wire.

According to a twelfth aspect of the present invention, in the wire feeding mechanism of any of the first to fourth aspects, a portion of the intermediate portion of the wire forms a plurality of loops, and the cushioning mechanism is configured to maintain the plurality of loops, and change the area of the loops in accordance with change in the partial path length.

According to a thirteenth aspect of the present invention, the wire feeding mechanism of any of the first to twelfth aspects further includes a second feeding roller arranged between the wire supply source and the cushioning mechanism. Also, the cushioning mechanism is configured to apply tension to a wire portion between the first feeding roller and the second feeding roller.

According to a fourteenth aspect of the present invention, in the wire feeding mechanism of any of the second to thirteenth aspects, the at least one catching portion is provided with a pulley that comes into contact with the wire.

A fifteenth aspect of the present invention provides an arc processing system. This arc processing system includes the wire feeding mechanism of any of the first to fourteenth aspects, a wire supply source that supplies wire to be fed by the wire feeding mechanism, and a robot that performs arc processing using the wire.

Other features and advantages of the present invention will become apparent from the detailed description given below with reference to the accompanying drawings.

DETAILED DESCRIPTION OF THE PREFERRED EMBODIMENTS

The following describes embodiments of the present invention in detail with reference to the drawings.

A wire feeding mechanism according to a first embodiment of the present invention and an arc processing system that employs the wire feeding mechanism will be described below with reference to FIGS. 1 to 8.

Figure 1:
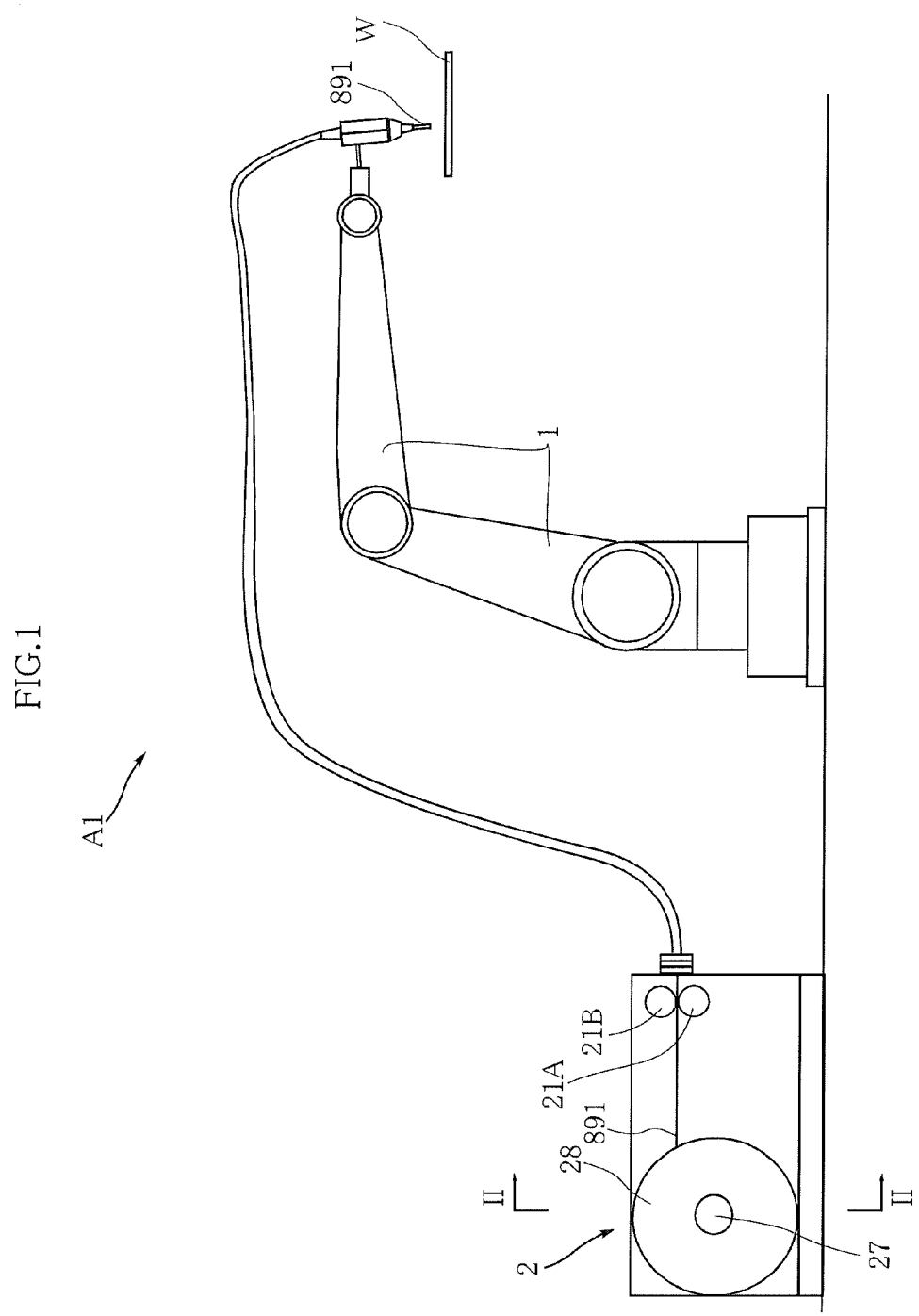
FIG. 1 is a schematic diagram of an arc processing system that employs a wire feeding mechanism according to a first embodiment of the present invention.

FIG. 1 is a schematic diagram of the arc processing system. An arc processing system A1 shown in this figure includes a robot 1 and a wire feeding mechanism 2.

The robot 1 performs arc processing on a workpiece W. Examples of arc processing include welding and thermal spraying. In the present embodiment, the robot 1 automatically performs arc welding on the workpiece W. The robot 1 is a multi-jointed robot for example, and has a welding torch attached to its tip. The robot 1 performs arc processing using wire 891 supplied by the wire feeding mechanism 2. Note that a mode is possible in which, unlike the present embodiment, the welding torch is operated by a person instead of the robot 1.

As shown in FIG. 1, the wire feeding mechanism 2 includes a pair of feeding rollers 21A and 21B, a holding member 27, and a wire reel (wire supply source) 28.

Figure 2:
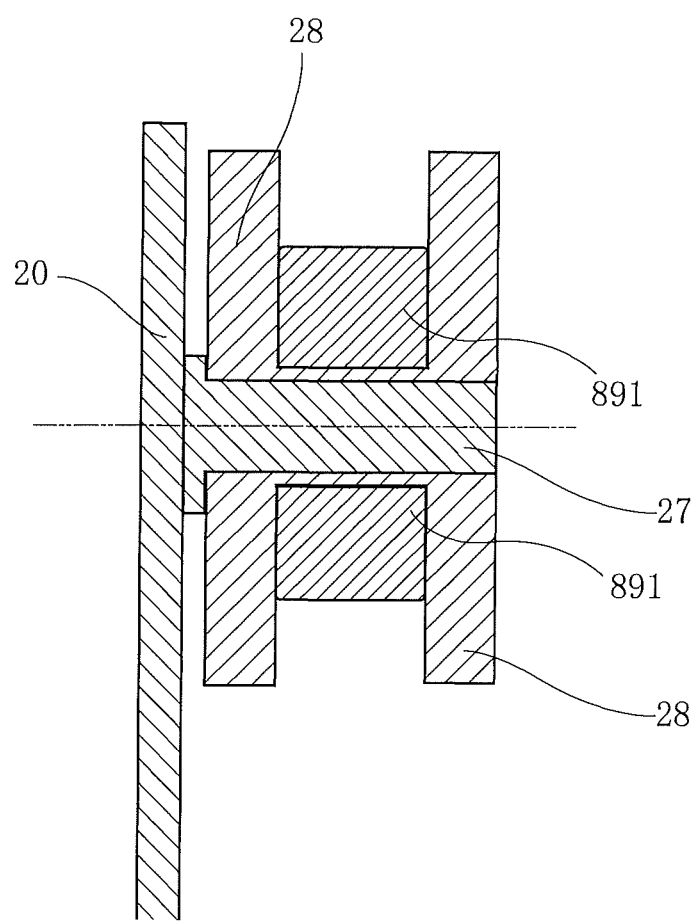
FIG. 2 is a cross-sectional diagram taken along line II-II in FIG. 1.

Although the holding member 27 is in the mode of a shaft (having a circular cross-section) that rotatably supports the wire reel 28 in the illustrated example, the present invention is not limited to this. Also, as shown in FIG. 2, the wire feeding mechanism 2 includes a support 20 to which one end of the holding member 27 is fixed. Furthermore, as shown in FIG. 3, the wire feeding mechanism 2 includes a drive portion 24 and a cushioning mechanism 25.

The support 20 (FIG. 2) is a plate-shaped or frame-shaped member made of metal, for example. Although not shown in the figure, the bottom portion of the support 20 is attached to a bottom plate that extends horizontally, for example.

The holding member 27 holds the wire reel 28 on which the wire 891 is wound. The wire reel 28 is held so as to be capable of rotating relative to the holding member 27.

Figure 3:
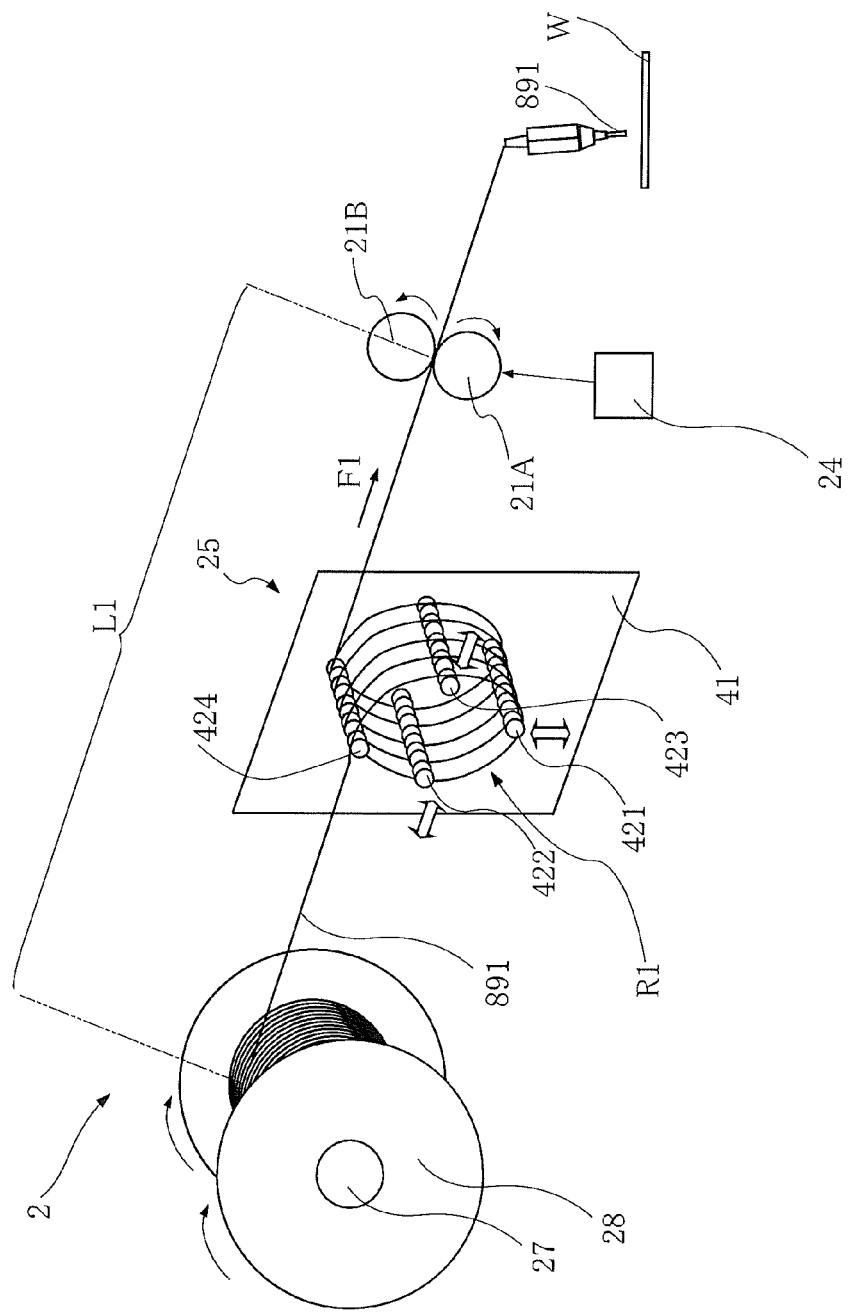
FIG. 3 is a schematic diagram of the wire feeding mechanism according to the first embodiment.

The wire reel 28 feeds out the wire 891 as it rotates clockwise in FIG. 3. When the feeding of the wire 891 is to be stopped, braking force is applied to the wire reel 28 by friction or the like so as to quickly stop the rotation. When the wire reel 28 is rotating at a constant speed, the magnitude of the braking force is the same as the pulling force applied to the wire 891 by the feeding rollers 21A and 21B. The wire reel 28 is configured to rotate with only force received from the wire 891 pulled by the feeding roller 21A. In other words, the wire reel 28 is not provided with a driving means (e.g., a motor) for actively rotating the wire reel.

At least one of the feeding rollers 21A and 21B is driven by the drive portion 24 (motor). As shown in FIG. 3, the feeding rollers 21A and 21B rotate in directions opposite to each other while sandwiching the wire 891 therebetween. The feeding rollers 21A and 21B thus feed out the wire 891 in a feeding direction Fl. The feeding rollers 21A and 21B are provided at respective fixed positions relative to the holding member 27 (and thus the wire reel 28, which is the wire supply source). Note that a configuration is possible in which, unlike the present embodiment, the positions of the feeding rollers 21A and 21B change relative to the holding member 27.

The cushioning mechanism 25 shown in FIG. 3 is configured to apply predetermined tension to the portion of the wire 891 that corresponds to a "partial path length L1" of the wire 891 while the partial path length is changing. Here, the partial path length L1 is the net length of the wire 891 from the wire reel 28 to the feeding rollers 21A and 21B.

The cushioning mechanism 25 holds the wire 891 in a state in which one or more loops R1 are formed in the wire 891. As will be described below, the cushioning mechanism 25 changes the size of the loops R1 or the area thereof (more specifically, the area of the region enclosed by the loops R1). In the present embodiment, the cushioning mechanism 25 holds the wire 891 in the state of being wound in a spiral. The cushioning mechanism 25 changes the area of the loops R1 forming the spiral while maintaining the state in which the loops R1 overlap each other (as viewed in the direction along the central axis of the spiral). The length of the loops R1 is changed in this manner.

Figure 4:
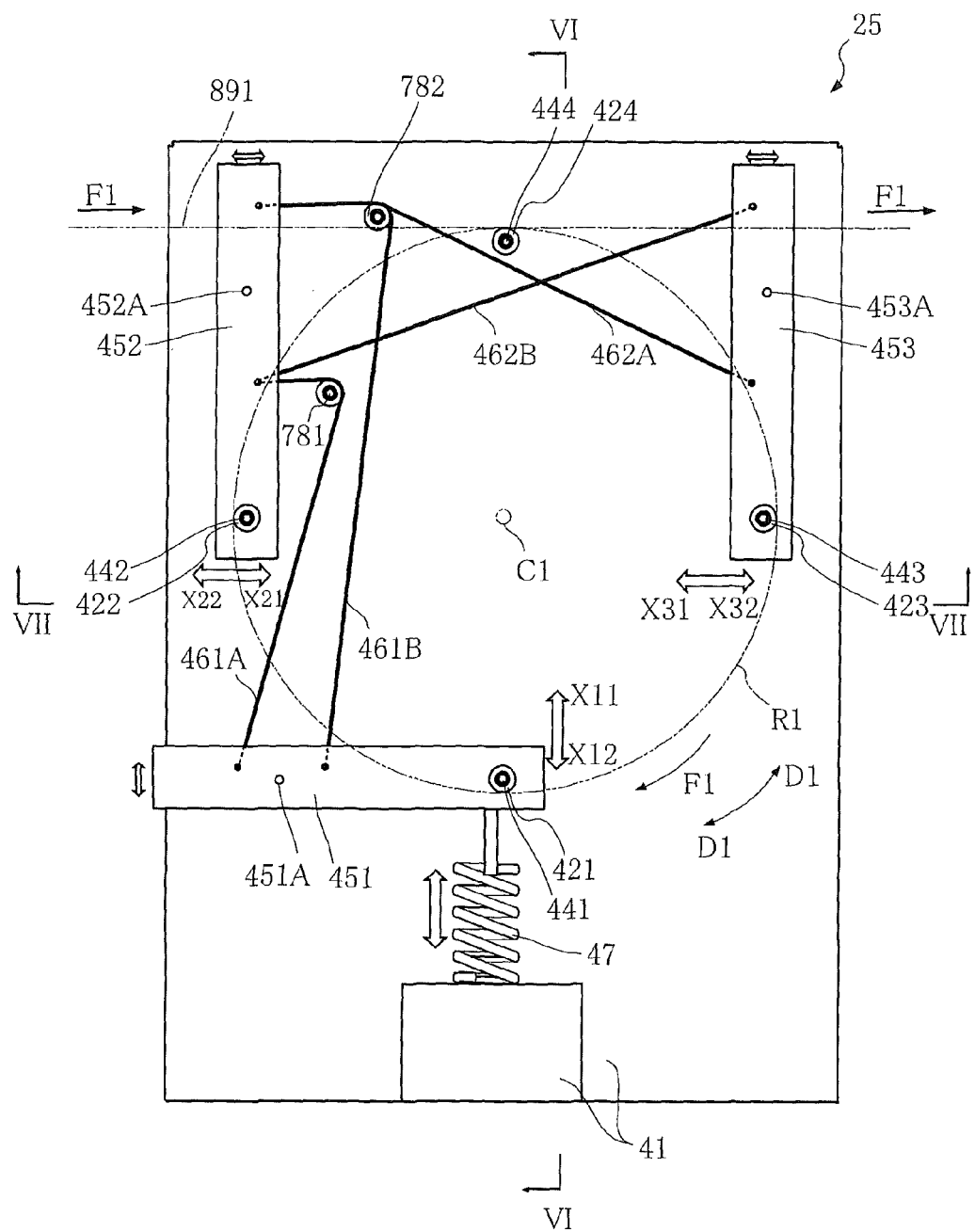
FIG. 4 is a front view of a cushioning mechanism shown in FIG. 3.

FIG. 4 is a front view of the cushioning mechanism 25. The cushioning mechanism 25 has a base 41, multiple catching portions (first catching portion 421, second catching portion 422, third catching portion 423, fourth catching portion 424), multiple shafts (first shaft 441, second shaft 442, third shaft 443, fourth shaft 444), multiple support members (first support member 451, second support member 452, third support member 453), multiple connecting members (first connecting members 461A and 461B and second connecting members 462A and 462B), and a force applying member 47.

As shown in FIGS. 3 to 7, the first to fourth catching portions 421, 422, 423, and 424 are for holding the wire 891 in a spiral shape. These four catching portions are provided at mutually different positions in a circumferential direction D1 (see FIG. 4) of the loops R1. The catching portions are located inward of the loops R1.

Figure 6:
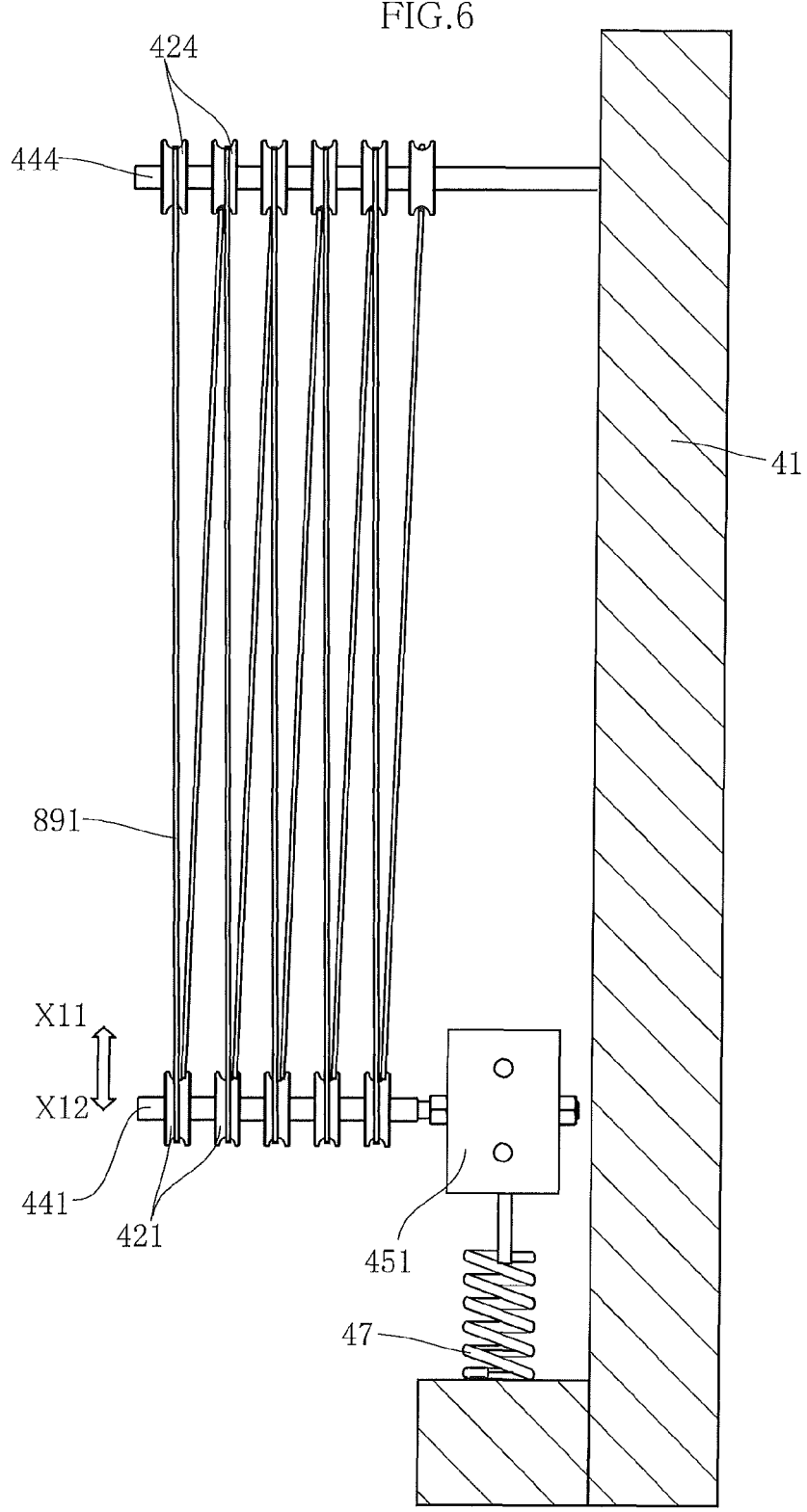
FIG. 6 is a cross-sectional diagram taken along line VI-VI in FIG. 4.
Figure 7:
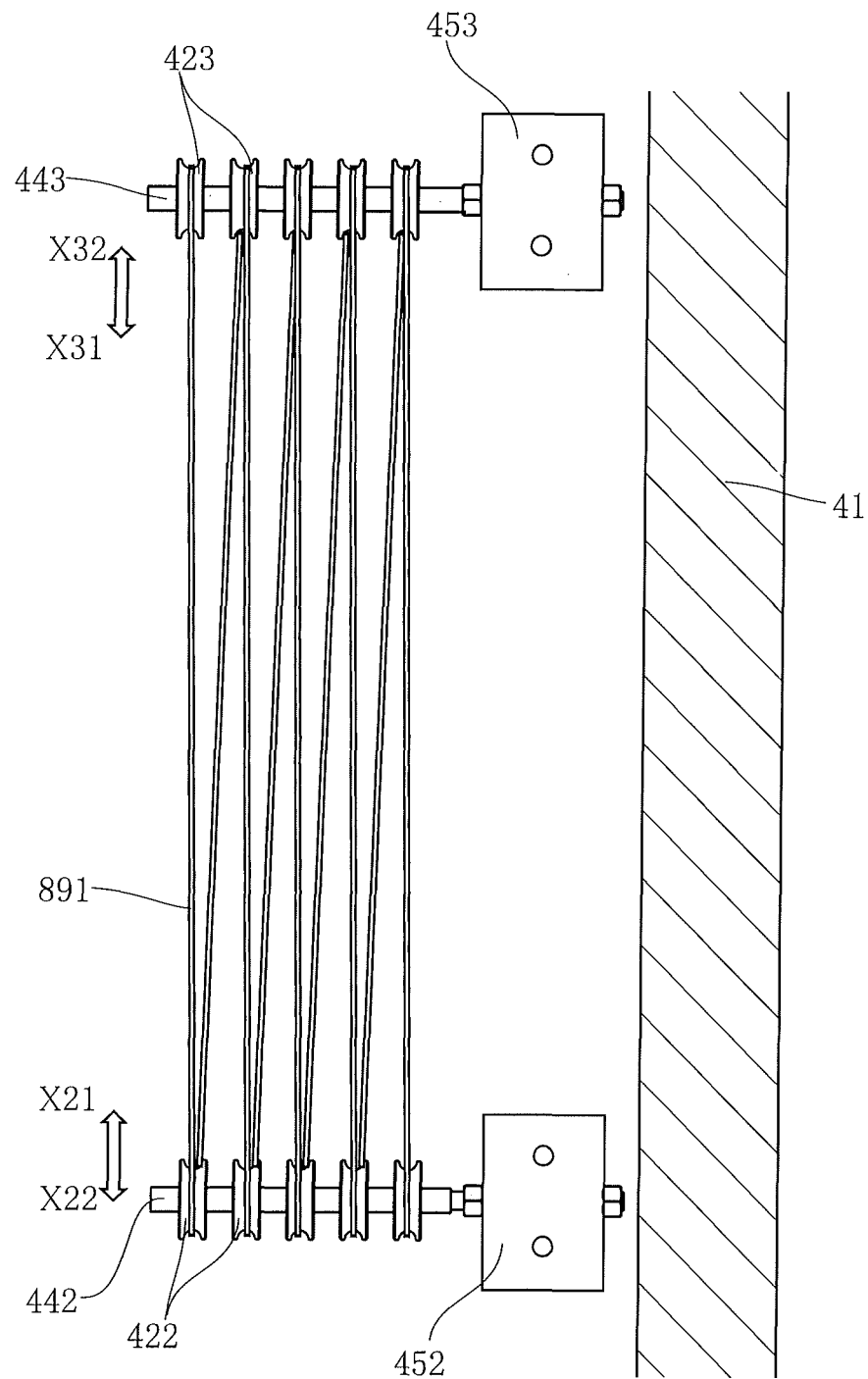
FIG. 7 is a cross-sectional diagram taken along line VII-VII in FIG. 4.

The catching portions 421 to 424 are configured such that the wire 891 is fed smoothly. In the present embodiment, as shown in FIGS. 6 and 7, the catching portions 421 to 424 are each constituted by multiple pulleys. The pulleys of the first catching portion 421 (FIG. 6) are supported so as to be capable of rotating about the first shaft 441. The pulleys of the second catching portion 422 (FIG. 7) are supported so as to be capable of rotating about the second shaft 442. The pulleys of the third catching portion 423 (FIG. 7) are supported so as to be capable of rotating about the third shaft 443. The pulleys of the fourth catching portion 424 (FIG. 6) are supported so as to be capable of rotating about the fourth shaft 444.

In the present embodiment, the aforementioned spiral shape of the wire 891 is formed by five loops, and the first catching portion 421, the second catching portion 422, and the third catching portion 423 each have five pulleys. The fourth catching portion 424, however, has six pulleys (FIG. 6).

As shown in FIG. 3, the wire 891 drawn from the wire reel 28 is first caught by the fourth catching portion 424 (the most outward pulley thereof). The wire 891 is then caught by the third catching portion 423 (the most outward pulley thereof), the first catching portion 421 (the most outward pulley thereof), and the second catching portion 422 (the most outward pulley thereof). Subsequently, the wire 891 is caught by the fourth catching portion 424 (the second most outward pulley thereof). The spiral made up of five loops R1 is formed in this manner. Lastly, the wire 891 is caught by the fourth catching portion 424 (the most inward pulley thereof) and sent toward the feeding rollers 21A and 21B.

In the present embodiment, the first support member 451, the second support member 452, and the third support member 453 are each a rectangular column-shaped member (see FIGS. 6 and 7). The support members 451, 452, and 453 are supported so as to be capable of moving relative to the base 41. In the present embodiment, the first support member 451 pivots about a first pivot shaft 451A, the second support member 452 pivots about a second pivot shaft 452A, and the third support member 453 pivots about a third pivot shaft 453A.

Figure 5:
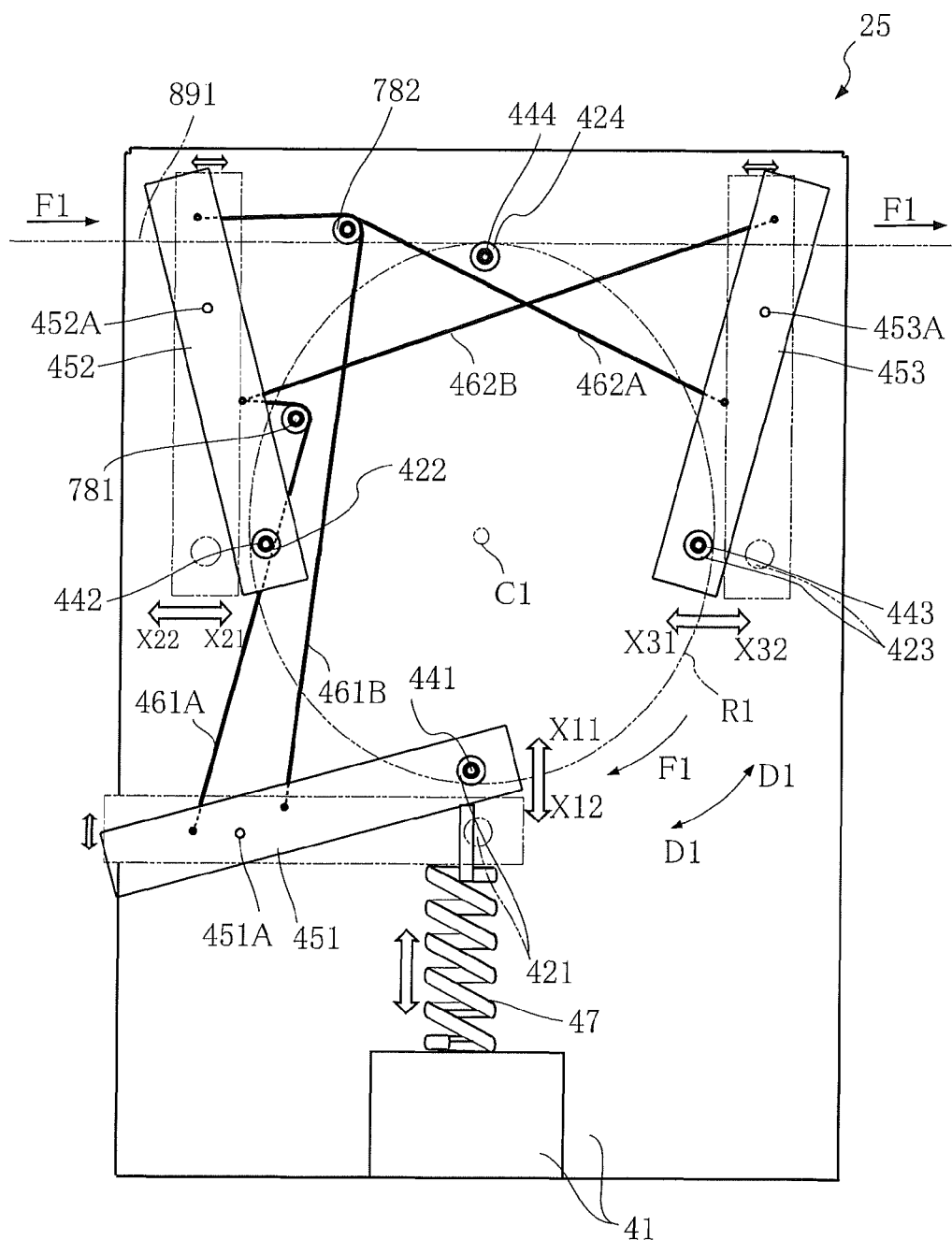
FIG. 5 is a diagram illustrating operation modes of the cushioning mechanism shown in FIG. 4.

As shown in FIG. 5, the first support member 451 supports the first catching portion 421 via the first shaft 441. The first catching portion 421 moves in a direction X11 and a direction X12 due to the pivoting of the first support member 451. As previously described, the first support member 451 is supported to the base 41. Accordingly, the first catching portion 421 is supported to the base 41 via the first shaft 441 and the first support member 451.

Similarly, the second support member 452 supports the second catching portion 422 via the second shaft 442. The second catching portion 422 moves in a direction X21 and a direction X22 due to the pivoting of the second support member 452. The third support member 453 supports the third catching portion 423 via the third shaft 443. The third catching portion 423 moves in a direction X31 and a direction X32 due to the pivoting of the third support member 453.

As can be understood from FIGS. 4 and 5, the first connecting members 461A and 461B and the second connecting members 462A and 462B are for synchronizing the movement of the first to third catching portions 421 to 423. The connecting members 461A and 461B as well as 462A and 462B are belts or wires, for example.

The first connecting members 461A and 461B connect the first support member 451 to the second support member 452 while being respectively wound around pulleys 781 and 782. When the first support member 451 pivots in the direction X11, the second support member 452 is pulled by the first connecting member 461A and pivots in the direction X21. On the other hand, when the first support member 451 pivots in the direction X12, the second support member 452 is pulled by the first connecting member 461B and pivots in the direction X22.

The second connecting member 462A connects the second support member 452 to the third support member 453 while being wound around the pulley 782. On the other hand, the second connecting member 462B directly connects (i.e., not via a pulley) the second support member 452 to the third support member 453. When the second support member 452 pivots in the direction X21, the third support member 453 is pulled by the second connecting member 462A and pivots in the direction X31. On the other hand, when the second support member 452 pivots in the direction X22, the third support member 453 is pulled by the second connecting member 462B and pivots in the direction X32.

As shown in FIG. 5, if the first catching portion 421 moves in the direction of approaching a center C1 of the loops R1 (i.e., in the direction X11), the other catching portions (the second catching portion 422 and the third catching portion 423) move in the direction of approaching the center C1 of the loops R1 (i.e., in the directions X21 and X31). On the other hand, if the first catching portion 421 moves in the direction of separation from the center C1 of the loops R1 (i.e., in the direction X12), the other catching portions (the second catching portion 422 and the third catching portion 423) move in the direction of separation from the center C1 of the loops R1 (i.e., in the directions X22 and X32). In this way, the movement of the catching portions (the first to third catching portions 421, 422, and 423) is synchronized.

The movement stroke (displacement amount) of the first catching portion 421 is set higher than the movement stroke of the second catching portion 422 and the third catching portion 423. In the present embodiment, the movement stroke of the first catching portion 421 is set to a value two times the movement stroke of the second catching portion 422 and the third catching portion 423. This is done in consideration of slack in the wire 891 due to gravity. If there is no need to take the influence of gravity into consideration for example, a configuration is possible in which, unlike the present embodiment, the movement strokes of the first to third catching portions 421, 422, and 423 are set to the same value.

The force applying member 47 applies force to at least one of the catching portions so as to increase the area of the loops R1 (i.e., increase the partial path length L1). In the present embodiment, the force applying member 47 is configured to apply force to the first catching portion 421. More specifically, as shown in FIG. 4, the force applying member 47 is connected to the base 41 and the first support member 451. The force applying member 47 applies force to the first support member 451, and thus to the first catching portion 421. The force applied to the first support member 451 is transmitted to the second catching portion 422 via the second support member 452. Also, the force transmitted to the second support member 452 is transmitted to the third catching portion 423 via the third support member 453. In the present embodiment, the force applying member 47 is a coil spring, one end of which is connected to the base 41, and the other end of which is connected to the first support member 451. A configuration is possible in which, unlike the present embodiment, the force applying member 47 is an elastic member made of rubber or the like. Also, the force applying member 47 may apply force to the first catching portion 421 or the like using gravity or gas pressure.

Next, the operation of the cushioning mechanism 25 will be described.

<Stopping The Feeding of Wire 891>

Figure 8:
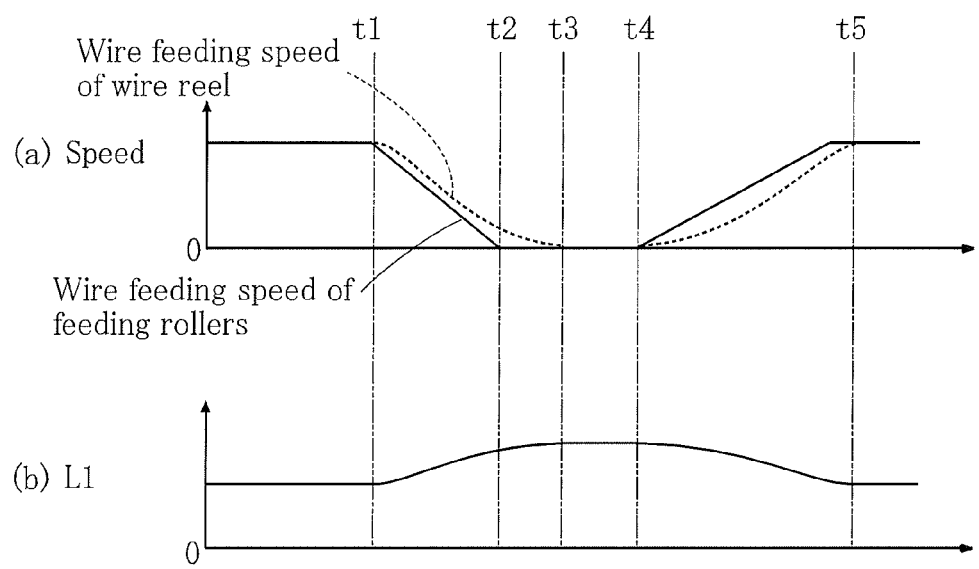
FIG. 8 is a chart illustrating operation modes of the wire feeding mechanism according to the first embodiment, in which (a) shows a comparison between the speed of the wire fed from the wire reel and the speed of the wire fed by feeding rollers, and (b) shows change in the partial path length (L1) of the wire.

As shown by (a) in FIG. 8, when the feeding of the wire 891 is to be stopped, the rotation speed of the feeding rollers 21A and 21B first starts to decrease at a time t1, and then the rotation stops at a time t2. As a result, the feeding of the wire 891 by the feeding rollers 21A and 21B is stopped at the time t2. However, as shown by the dashed line, the wire reel 28 is still rotating at the time t2 due to inertia. The rotation of the wire reel 28 then stops at a time t3, and thus the feeding of the wire 891 from the wire reel 28 stops. Accordingly, as shown by (b) in this figure, when the rotation of the wire reel 28 has stopped at the time t3, the partial path length L1 is higher than the normal value (before the time t1) in arc processing. The area of the loops R1 is therefore higher than the normal value in arc processing.

<Starting The Feeding of Wire 891>

Next, as shown by (a) in this figure, at a time t4, the feeding rollers 21A and 21B start to rotate, and thus the feeding rollers 21A and 21B start to feed the wire 891. As shown by (b) of this figure, when the feeding of the wire 891 starts, the partial path length L1 remains the same as the value at the time t3. As previously mentioned, the cushioning mechanism 25 maintains the state in which tension is applied to the portion of the wire 891 from the wire reel 28 to the feeding rollers 21A and 21B. For this reason, as shown by the dashed line in (a) of this figure, at the same time as the rotation of the feeding rollers 21A and 21B starts (the time t4), the wire reel 28 is subjected to force from the wire 891 and starts to rotate. As shown by (b) in this figure, the partial path length L1 gradually decreases from the time t4 to a time t5 due to the wire 891 being pulled by the feeding rollers 21A and 21B. The area of the loops R1 therefore also gradually decreases. Then, when the speed of the feeding of the wire 891 by the wire reel 28 reaches the same speed as the speed of the feeding of the wire 891 by the feeding rollers 21A and 21B at the time t5, the partial path length L1 no longer changes, and the area of the loops R1 is kept constant. Desired arc processing is then performed from the time t5 onward.

Next, effects of the present embodiment will be described.

In the present embodiment, the cushioning mechanism 25 maintains the state in which tension is applied to the portion of the wire from the wire reel 28 to the feeding rollers 21A and 21B while the partial path length L1 is changing. According to this configuration, the wire 891 can be accelerated without slippage and be stably fed from the start of the rotation of the feeding rollers 21A and 21B. In particular, in the present embodiment, the wire reel 28 starts to rotate as soon as the feeding rollers 21A and 21B start to rotate, as previously mentioned. Accordingly, it is possible to prevent the rotation of the wire reel 28 from starting while the feeding rollers 21A and 21B are rotating. For this reason, tension is never rapidly applied to the wire 891 while the feeding rollers 21A and 21B are rotating. It is therefore possible to prevent slippage between the wire 891 and the feeding rollers 21A and 21B while the feeding rollers 21A and 21B are rotating. According to this configuration, the wire 891 can be accelerated without slippage and be stably fed from the start of the rotation of the feeding rollers 21A and 21B.

In the present embodiment, the wire reel 28 with the wire 891 wound thereon is applied as an example of the wire supply source. However, drum-packed wire may be used as the wire supply source.

Due to the ability to prevent slippage between the wire 891 and the feeding rollers 21A and 21B, it is possible to obtain a wire 891 feeding speed that corresponds to an instructed speed. Also, according to the configuration of the present embodiment, it is possible to extend the period in which the rotation speed of the wire reel 28 is raised, thus making it possible to reduce the load subjected on the feeding rollers 21A and 21B.

In the present embodiment, the cushioning mechanism 25 holds the wire 891 in the state in which the wire 891 forms the loops R1. Also, the cushioning mechanism 25 can change the area of the loops R1. According to this configuration, it is possible to prevent inappropriate deformation of the wire 891 when the partial path length L1 changes.

In the present embodiment, the catching portions (the first to third catching portions 421, 422, and 423) are supported so as to be capable of moving relative to the base 41 (and thus relative to the feeding rollers 21A and 21B or the holding member 27). The cushioning mechanism 25 includes the first connecting members 461A and 461B and the second connecting members 462A and 462B that synchronize the movement of these catching portions. According to this configuration, it is possible to more favorably prevent inappropriate deformation of the wire 891 when the partial path length L1 changes.

Note that a configuration is possible in which, unlike the present embodiment, only the first catching portion 421 is supported so as to be capable of moving relative to the base 41. Alternatively, any of the four catching portions 421, 422, 423, and 424 may be supported so as to be capable of moving relative to the base 41.

In the present embodiment, the cushioning mechanism 25 holds the wire 891 in the state of being wound in a spiral. According to this configuration, it is possible to increase the amount that the partial path length L1 can be changed. Accordingly, even if the wire reel 28 normally rotates at a high speed, it is possible to maintain the state in which tension is applied to the portion of the wire from the wire reel 28 to the feeding rollers 21A and 21B, and the cushioning mechanism 25 can appropriately hold the wire 891. This is favorable in high-speed feeding of wire by the feeding rollers 21A and 21B. Also, according to the configuration of the present embodiment that enables increasing the amount that the partial path length L1 can be changed, it is possible to reduce the frictional braking force required to stop the rotation of the wire reel 28, which as a result enables stably feeding the wire 891.

A first variation of the first embodiment will be described below with reference to FIG. 9. Note that in the following description, configurations that are the same as or similar to configurations in the above description will be denoted by the same reference signs, and descriptions thereof will be omitted when appropriate.

Figure 9:
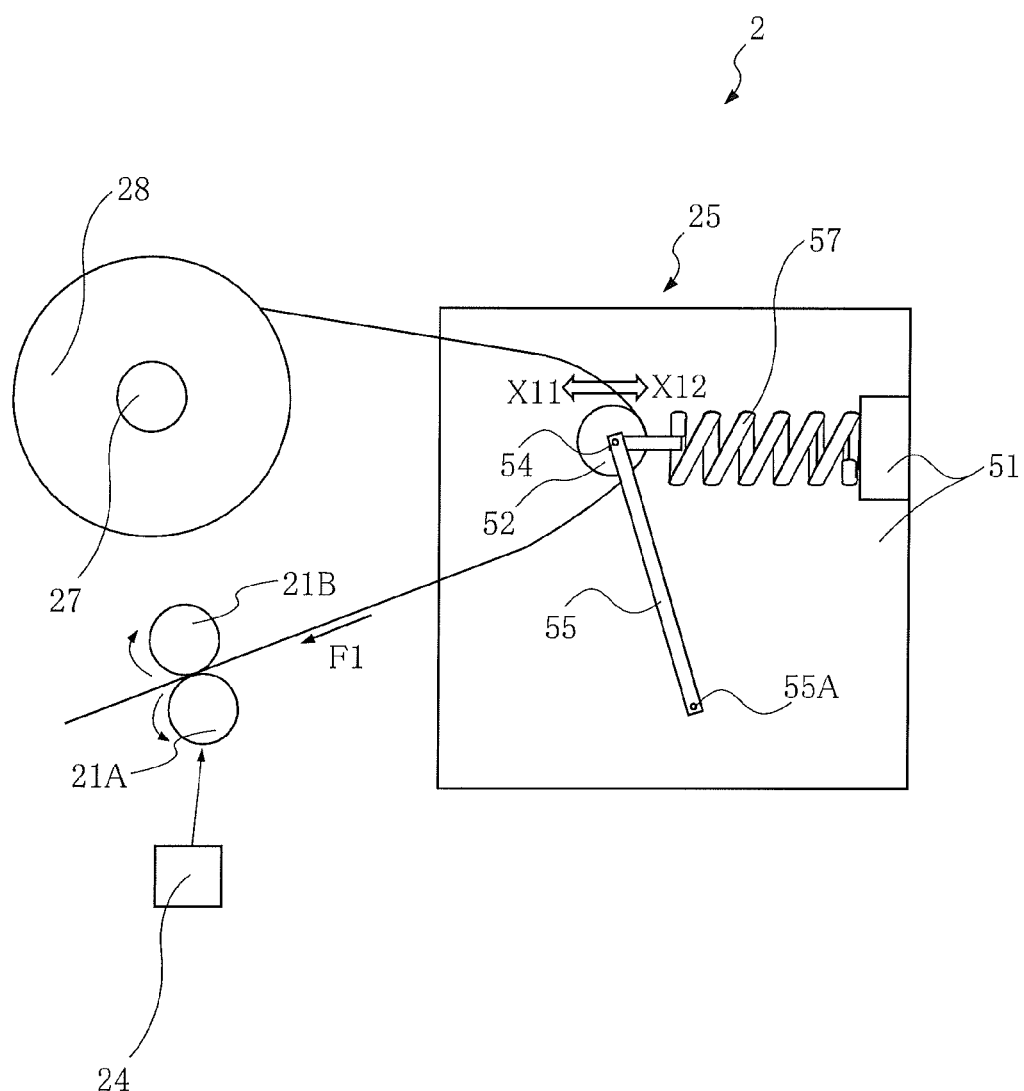
FIG. 9 is a schematic diagram of a wire feeding mechanism according to a first variation of the first embodiment.

FIG. 9 is a schematic diagram of a wire feeding mechanism according to the first variation of the first embodiment. In the present variation, the configuration of the cushioning mechanism 25 in the wire feeding mechanism 2 is different from the above-described embodiment. The cushioning mechanism 25 of the present variation has a base 51, a catching portion 52, a shaft 54, a support member 55, and a force applying member 57.

The cushioning mechanism 25 maintains a state in which tension is applied to the portion of the wire from the wire reel 28 to the feeding rollers 21A and 21B while the partial path length L1 (which, although not shown in FIG. 9, has the same meaning as in the first embodiment) is changing.

In the present variation, the catching portion 52 is moved by a link mechanism. This will be described in detail below.

The catching portion 52 is for catching the wire 891, and is configured such that the wire 891 is fed smoothly. The catching portion 52 is a pulley, for example. The catching portion 52 is supported so as to be capable of rotating about the shaft 54. The catching portion 52 is capable of moving relative to the feeding rollers 21A and 21B and the holding member 27.

The support member 55 is supported so as to be capable of moving relative to the base 51. Specifically, the support member 55 is supported so as to be capable of pivoting about a pivot shaft 55A relative to the base 51.

The support member 55 rotatably supports the catching portion 52 via the shaft 54. The catching portion 52 moves in the direction X11 and the direction X12 due to the support member 55 pivoting about the pivot shaft 55A.

The force applying member 57 applies force to the catching portion 52. The force applying member 57 applies force to the catching portion 52 so as to increase the partial path length L1. The force applying member 57 uses elastic force to apply force to the catching portion 52. In the illustrated example, the force applying member 57 is a coil spring. However, the force applying member 57 may be an elastic member made of rubber or the like. As shown in FIG. 9, the force applying member 57 is connected to the base 51 and the support member 55.

In the present variation as well, the cushioning mechanism 25 maintains the state in which tension is applied to the portion of the wire from the wire reel 28 to the feeding rollers 21A and 21B while the partial path length L1 is changing. According to this configuration, similarly to the above-described first embodiment, the wire 891 can be accelerated without slippage and be stably fed from the start of the rotation of the feeding rollers 21A and 21B.

A second variation of the first embodiment will be described below with reference to FIG. 10.

Figure 10:
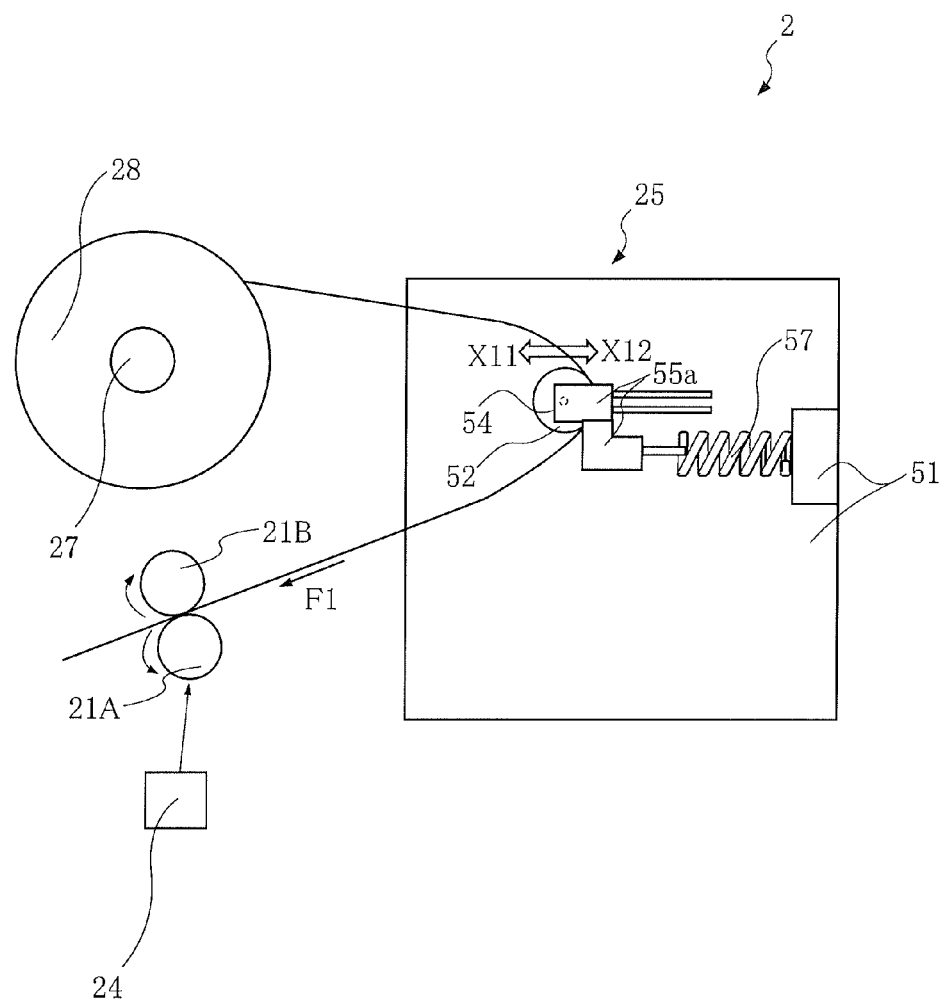
FIG. 10 is a schematic diagram of a wire feeding mechanism according to a second variation of the first embodiment.

FIG. 10 is a schematic diagram of a wire feeding mechanism according to the second variation of the first embodiment. In the present variation, the configuration of the cushioning mechanism 25 is different from the above-described first variation. In the present variation, a support member 55a that supports the catching portion 52 is capable of translation in the X11-X12 direction. In the present variation as well, the force applying member 57 applies force to the catching portion 52 similarly to the above-described first variation. Effects similar to the above-described first variation can be obtained by this configuration as well.

A third variation of the first embodiment will be described below with reference to FIG. 11.

Figure 11:
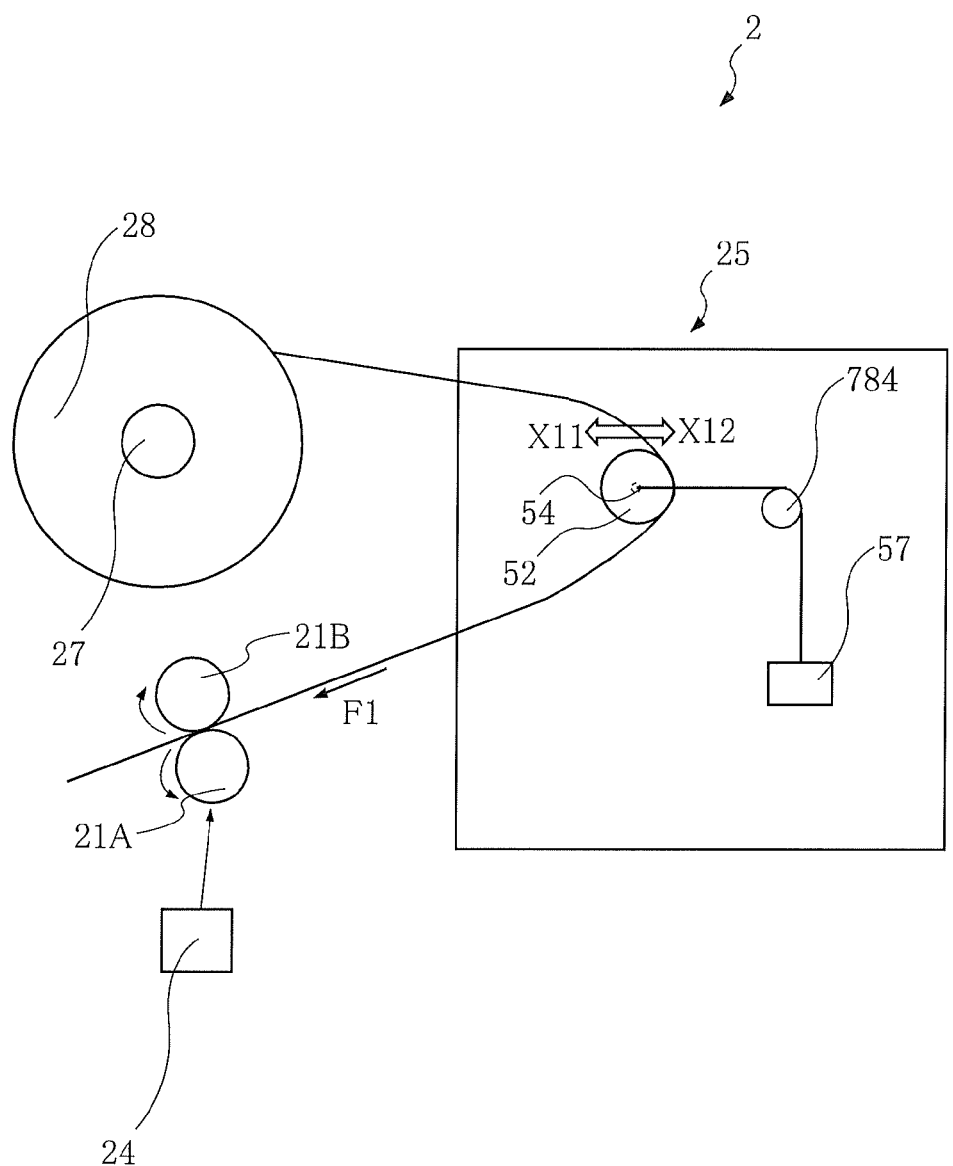
FIG. 11 is a schematic diagram of a wire feeding mechanism according to a third variation of the first embodiment.

FIG. 11 is a schematic diagram of a wire feeding mechanism according to the third variation of the first embodiment.

The present variation is different from the first variation and the second variation described above in that the force applying member 57 of the cushioning mechanism 25 is a weight. The force applying member 57 (weight) is connected to the catching portion 52 via a cord or belt wound around a pulley 784. It applies force to the catching portion 52 so as to increase the partial path length L1. Effects similar to the above-described first variation can be obtained by this configuration as well.

A fourth variation of the first embodiment will be described below with reference to FIG. 12.

Figure 12:
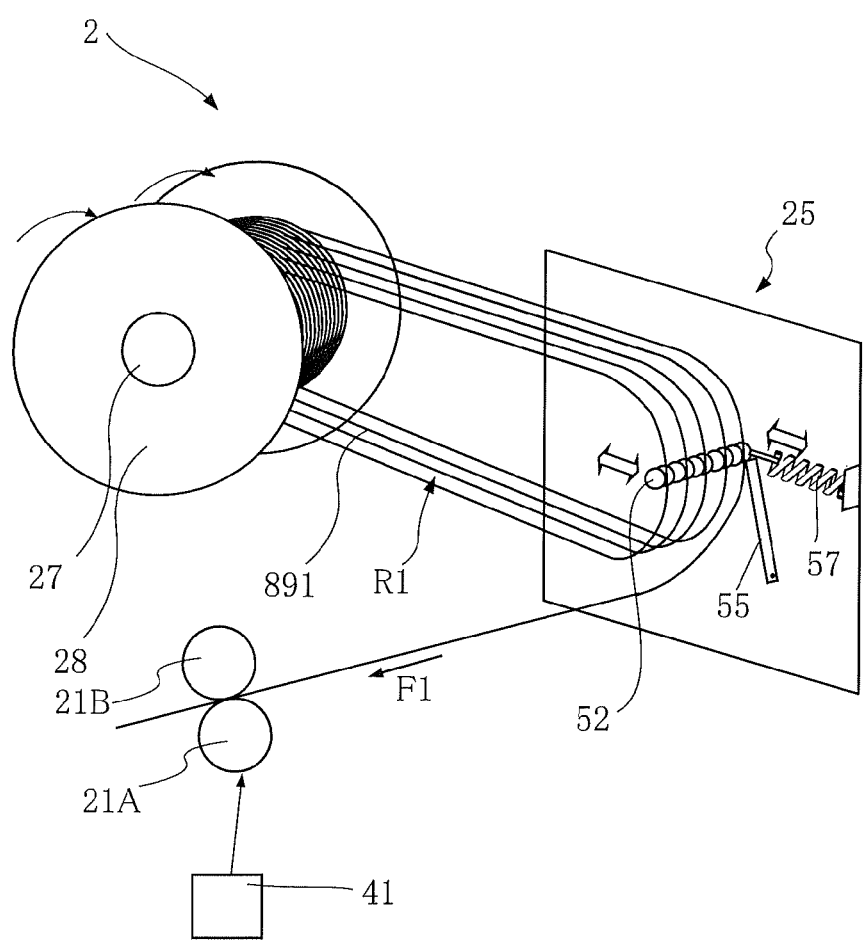
FIG. 12 is a schematic diagram of a wire feeding mechanism according to a fourth variation of the first embodiment.

FIG. 12 is a schematic diagram of a wire feeding mechanism according to the fourth variation of the first embodiment.

The present variation is different from the above-described first variation in that the wire 891 is wound around the catching portion 52 in a state in which the loops R1 forming the spiral shape overlap each other in the horizontal direction. In the present variation, the cushioning mechanism 25 changes the area of the loops R1 forming the spiral shape while maintaining the loops R1. The changing of the area of the loops R1 and the changing of the partial path length L1 are the same as in the description given in the first embodiment. Effects similar to the above-described first variation can be obtained by this configuration as well.

A second embodiment of the present invention will be described below with reference to FIGS. 13 and 14.

Figure 13:
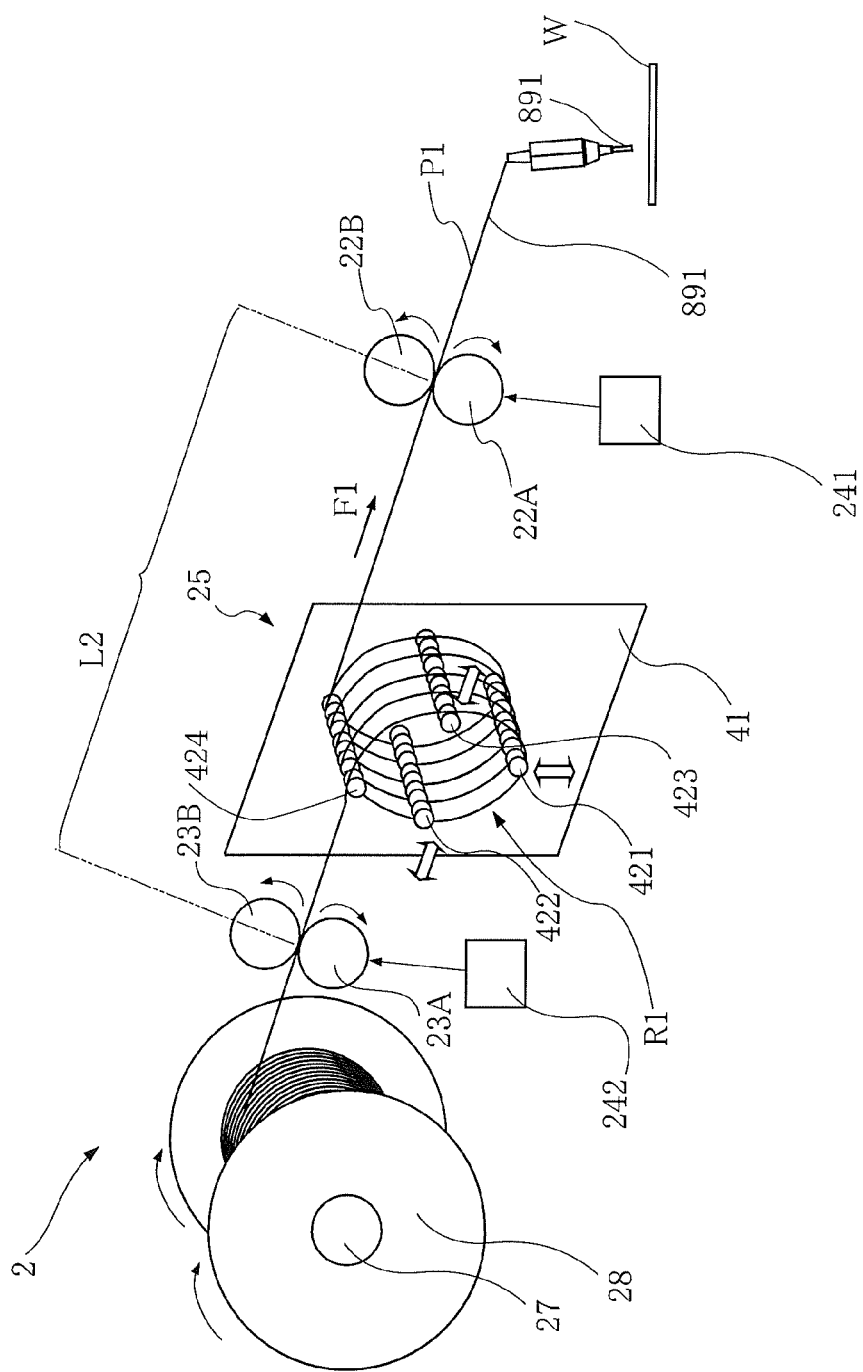
FIG. 13 is a schematic diagram of a wire feeding mechanism according to a second embodiment of the present invention.
Figure 14:
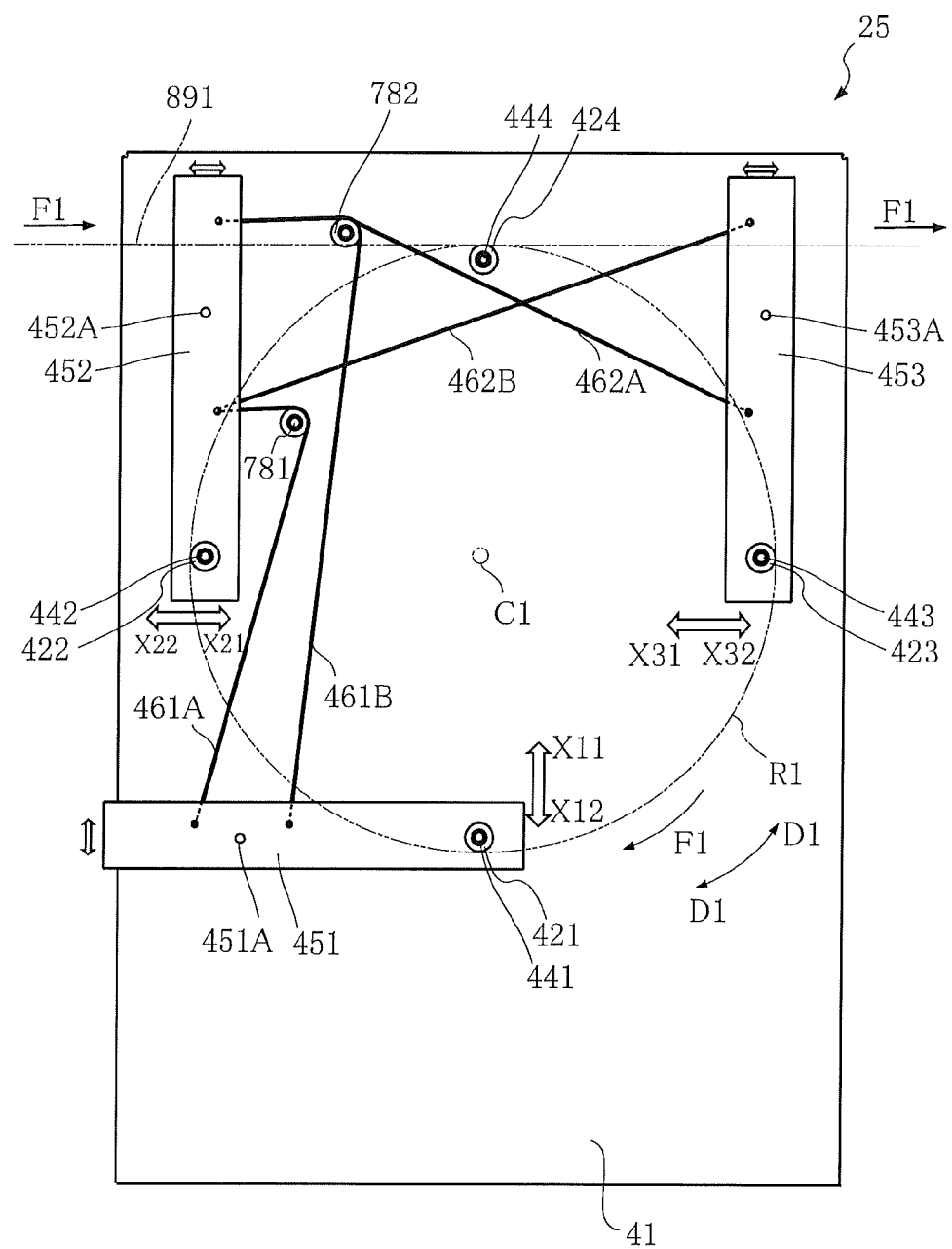
FIG. 14 is a front view of a cushioning mechanism shown in FIG. 13.

FIG. 13 is a schematic diagram of a wire feeding mechanism according to the second embodiment. FIG. 14 shows the cushioning mechanism shown in FIG. 13.

The wire feeding mechanism 2 of the present embodiment includes first feeding rollers 22A and 22B, second feeding rollers 23A and 23B, drive portions 241 and 242, the cushioning mechanism 25, and the holding member 27. Note that the illustrated wire feeding mechanism 2 can also be used with the robot 1 shown in FIG. 1.

The holding member 27 has a configuration similar to that of the holding member of the first embodiment.

At least one of the first feeding rollers 22A and 22B is driven by the drive portion 241 (motor). The first feeding rollers 22A and 22B rotate in directions opposite to each other while sandwiching the wire 891 therebetween. The first feeding rollers 22A and 22B thus feed out the wire 891 in the feeding direction F1.

The second feeding rollers 23A and 23B are located more upstream in the feeding direction F1 of the wire 891 than the first feeding rollers 22A and 22B. At least one of the second feeding rollers 23A and 23B is driven by the drive portion 242 (motor). The second feeding rollers 23A and 23B rotate in directions opposite to each other while sandwiching the wire 891 therebetween. The second feeding rollers 23A and 23B thus feed out the wire 891, which is drawn from the wire reel 28, in the feeding direction F1.

The cushioning mechanism 25 functions as a buffer mechanism for the wire 891. The cushioning mechanism 25 is arranged between the first feeding rollers 22A and 22B and the second feeding rollers 23A and 23B in a feed path P1 (see FIG. 13) of the wire 891. The wire 891 feed by the second feeding roller 23A and 23B passes through the cushioning mechanism 25 and then moves toward the first feeding rollers 22A and 22B. The cushioning mechanism 25 maintains the state in which tension is applied to the portion of the wire between the second feeding rollers and the first feeding rollers while a partial path length L2 (the length of this wire portion) is changing.

The constituent elements of the cushioning mechanism 25 are substantially the same as in the description of the first embodiment (see FIG. 4). However, the cushioning mechanism 25 of the present embodiment does not have the force applying member 47 (see FIG. 4). Of course the present invention is not limited to this, and a member corresponding to the force applying member 47 may be applied in the cushioning mechanism 25 of the present embodiment.

In the cushioning mechanism 25 of the present embodiment, the first support member 451 is normally subjected to force (gravity) for pivoting clockwise (FIG. 14) about the first pivot shaft 451A. For this reason, the wire is subjected to force in the X12 direction (force in the direction crossing the wire) from the first support member 451 via the first catching portion 421. Accordingly, appropriate tension is applied to the wire even when the size of the wire loops R1 changes.

If the speed of the feeding of the wire 891 by the second feeding rollers 23A and 23B is higher than the speed of the feeding of the wire 891 by the first feeding rollers 22A and 22B, the area of the loops R1 increases (the partial path length L2 increases). Conversely, if the former feeding speed is lower than the latter feeding speed, the area of the loops R1 decreases (the partial path length L2 decreases). A configuration is possible in which, for example, the partial path length L2 is constantly monitored, and the speed of feeding by the first or second feeding rollers is accordingly adjusted.

Next, effects of the present embodiment will be described.

According to the present embodiment as well, similarly to the first embodiment, it is possible to prevent slippage between the wire 891 and the feeding rollers, and the wire 891 can be fed stably.

In the present embodiment, the cushioning mechanism 25 holds the wire 891 in the state of being wound in a spiral. According to this configuration, it is possible to increase the amount that the partial path length L2 can be changed, and the buffering amount of the cushioning mechanism 25 can be increased. Accordingly, it is possible to accommodate arc processing (welding or thermal spraying) in which the wire 891 is fed at a high speed, and accommodate rapid changes in the speed of the wire 891. It is also possible to prevent the wire 891 from becoming severed during arc processing. Also, the cushioning mechanism 25 has a simple structure and is low-cost.

Drum-packed wire may be used in place of the wire reel 28 in the present embodiment as well.

The present invention is not intended to be limited to the above-described embodiments. The specific configurations of the various elements of the present invention can be designed and modified in various ways as necessary.

The invention claimed is:

1. An arc processing system that is configured to perform arc processing on a workpiece, the arc processing system comprising:
a wire supply source that supplies arc processing wire;
a wire feed mechanism that receives the arc processing wire from the wire supply source, the wire feed mechanism includes first and second rotatable feeding rollers that sandwich the arc processing wire therebetween to feed out the arc processing wire from the wire feed mechanism along a feed path;
a robot disposed downstream from the wire feed mechanism and that receives the arc processing wire, the robot is configured to perform arc processing on the workpiece using the arc processing wire;
a cushioning mechanism arranged in the feed path between the wire supply source and the wire feed mechanism, the cushioning mechanism includes:
a common base;
a plurality of supports movably mounted on the common base and that are movable relative to each other;
a plurality of arc processing wire catches attached to the plurality of supports, the plurality of arc processing wire catches are engaged with the arc processing wire and are configured to hold the arc processing wire in a plurality of loops;
wherein the arc processing wire has an intermediate portion that extends from the wire supply source to the wire feed mechanism, and the cushioning mechanism is configured to apply tension to the intermediate portion of the arc processing wire while a partial path length of the intermediate portion is changing, the partial path length being the length of the intermediate portion,
the arc processing wire catches of the cushioning mechanism are configured to hold the arc processing wire in a manner such that the plurality of loops are formed in the intermediate portion of the arc processing wire, and
the plurality of arc processing wire catches are mounted so as to be translationally movable in synchronization with each other relative to both of the common base and a center of the plurality of loops in accordance with a change in the partial path length, thereby changing an area of the plurality of loops, wherein the plurality of arc processing wire catches are parallel to each other while moving relative to the center.

2. The arc processing system according to claim 1, wherein the cushioning mechanism includes a force applying member that is attached to one of the plurality of arc processing wire catches to apply a force to the one of the plurality of arc processing wire catches so as to increase the partial path length.

3. The arc processing system according to claim 2, wherein the force applying member is configured to apply force to the one of the plurality of arc processing wire catches using any one of elastic force, gravity, and gas pressure.

4. The arc processing system according to claim 1, wherein the cushioning mechanism includes connecting members that synchronize movement of the plurality of arc processing wire catches.

5. The arc processing system according to claim 4, wherein the connecting members comprise one of a belt and a wire.

6. The arc processing system according to claim 1, further comprising a second wire feed mechanism, the second wire feed mechanism is arranged between the wire supply source and the cushioning mechanism, wherein the cushioning mechanism is configured to apply tension to a portion of the arc processing wire between the wire feed mechanism and the second wire feed mechanism.

7. The arc processing system according to claim 1, wherein each of the arc processing wire catches comprises a pulley that is in contact with the arc processing wire.

8. The arc processing system according to claim 1, wherein each of the plurality of support members is rotatable relative to the common base about an axis that is fixed in position to the center of the plurality of loops.

* * * * *